United States Patent
Freiberg et al.

(10) Patent No.: US 8,911,612 B2
(45) Date of Patent: Dec. 16, 2014

(54) METHOD OF OPERATING METAL-BROMINE CELLS

(75) Inventors: Mira Bergstein Freiberg, Omer (IL); Iris Ben David, Ashdod (IL); Ben-Zion Magnes, Meitar (IL)

(73) Assignee: Bromine Compounds Ltd., Be'er-Sheva (IL)

( * ) Notice: Subject to any disclaimer, the term of this patent is extended or adjusted under 35 U.S.C. 154(b) by 763 days.

(21) Appl. No.: 13/052,680

(22) Filed: Mar. 21, 2011

(65) Prior Publication Data

US 2011/0253553 A1 Oct. 20, 2011

Related U.S. Application Data

(60) Provisional application No. 61/315,997, filed on Mar. 22, 2010.

(51) Int. Cl.
*C25B 1/24* (2006.01)
*H01M 10/36* (2010.01)
*H01M 12/08* (2006.01)
*H01M 8/20* (2006.01)
*H01M 8/18* (2006.01)

(52) U.S. Cl.
CPC ............... *C25B 1/24* (2013.01); *H01M 10/365* (2013.01); *H01M 2300/0002* (2013.01); *H01M 2300/0005* (2013.01); *H01M 12/085* (2013.01); *Y02E 60/528* (2013.01); *H01M 8/20* (2013.01); *H01M 8/188* (2013.01)
USPC .......................................... 205/619; 429/199

(58) Field of Classification Search
CPC ..... H01M 10/365; H01M 12/085; C25B 1/24
USPC .......................................... 429/199; 205/619
See application file for complete search history.

(56) References Cited

U.S. PATENT DOCUMENTS

| | | | |
|---|---|---|---|
| 3,982,960 A * | 9/1976 | Hoekje et al. | 429/199 |
| 4,109,065 A | 8/1978 | Will et al. | |
| 4,615,108 A | 10/1986 | Tomazic | |
| 5,459,390 A | 10/1995 | Tomazic | |
| 5,702,842 A | 12/1997 | Tomazic | |
| 6,036,937 A | 3/2000 | Dunaway et al. | |

FOREIGN PATENT DOCUMENTS

| | | | |
|---|---|---|---|
| EP | 235445 A2 | | 9/1987 |
| EP | 411614 A1 | | 2/1991 |
| GB | 1350725 A | | 4/1974 |
| GB | 1425358 A | * | 2/1976 |
| JP | 07105992 A | * | 4/1995 |

OTHER PUBLICATIONS

"The Problem and Perversity of Perchlorate" (James H. Espenson, Perchlorate in the Environment, pp. 1-7, New York 2000).*

* cited by examiner

*Primary Examiner* — Nicholas A Smith
(74) *Attorney, Agent, or Firm* — Dilworth & Barrese, LLP.

(57) ABSTRACT

A method for generating molecular bromine in bromide-containing electrolyte solution suitable for use in a metal bromine cell, involves chemically oxidizing bromide ($Br^-$) in the electrolyte solution in an acidic environment, to produce the molecular bromine.

22 Claims, 1 Drawing Sheet

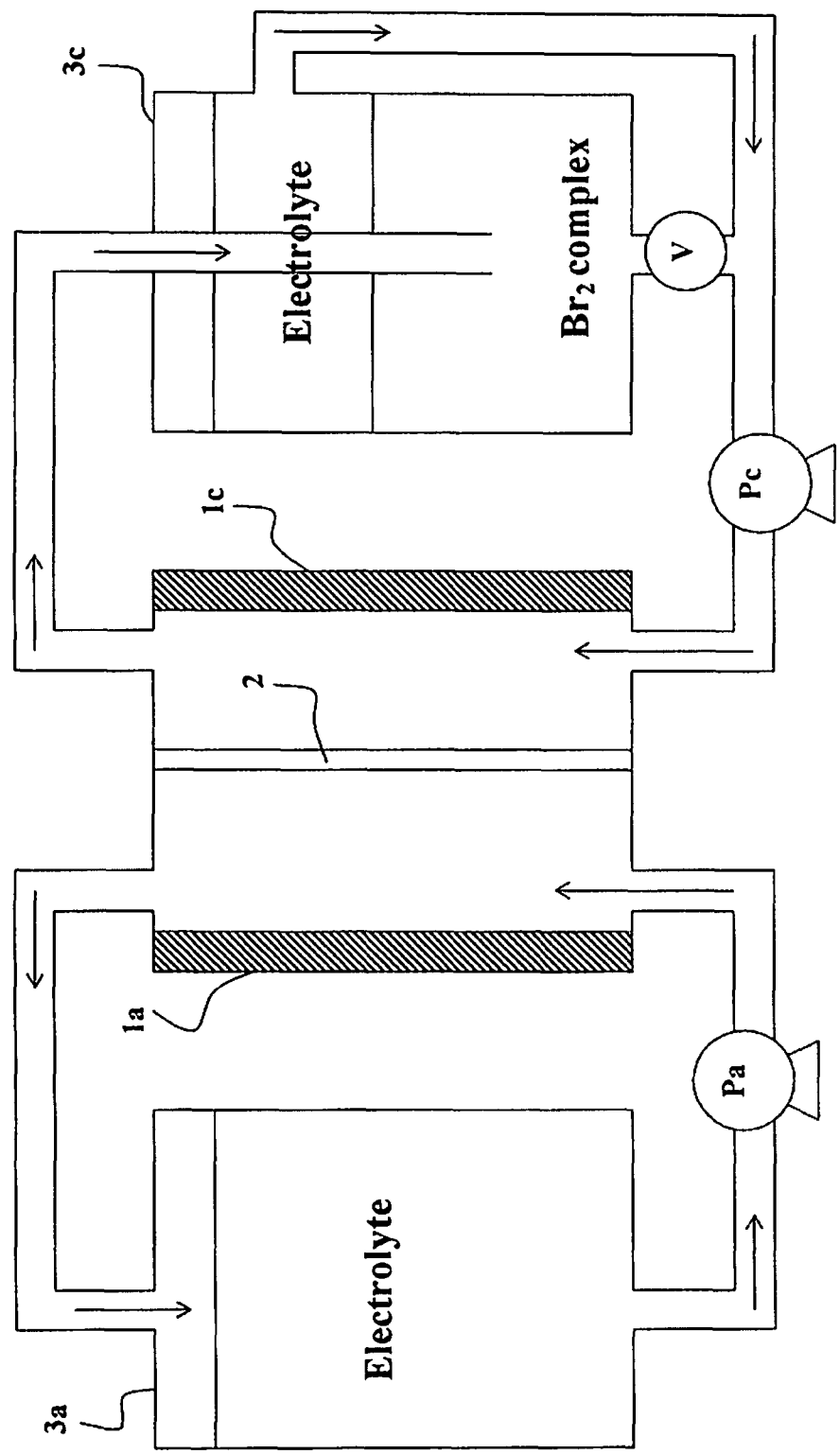

METHOD OF OPERATING METAL-BROMINE CELLS

BACKGROUND OF THE INVENTION

The invention relates to a method for generating elemental bromine in electrolyte solutions used for operating metal-bromine cells, such as zinc-bromine batteries.

Zinc-bromine rechargeable cell contains two chemically non-reactive electrodes and a suitable separator located between the electrodes (e.g., an ion exchange membrane). The electrolyte used in the cell is an aqueous solution of zinc bromide, which is generally fed to the two compartments of the cell from two separate external reservoirs, utilizing a suitable circulation system. The term "anode" is used herein to indicate the electrode where metal zinc is formed (during charge) and oxidized (during discharge). The term "cathode" is used herein to indicate the electrode where elemental bromine evolves (during charge) and reduced (during discharge). The charge and discharge states of zinc-bromine battery will now be described in more detail.

During charge, an electric current is supplied to the cell from an external source, causing the deposition of zinc metal onto the anode and the concurrent generation of elemental bromine at the cathode, as shown by the following reaction:

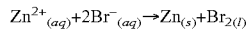

$$Zn^{2+}_{(aq)} + 2Br^{-}_{(aq)} \rightarrow Zn_{(s)} + Br_{2(l)}$$

The aqueous electrolyte solution which circulates through the cathodic side during the cell charge contains a water soluble complexing agent which is capable of readily forming a water-immiscible liquid phase upon complexing with molecular bromine. Thus, the molecular bromine generated at the cathodic side during cell charge reacts almost instantaneously with the water-soluble complexing agent, to form a water immiscible oily phase. The dense bromine-containing oily phase tends to settle at the bottom of the reservoir used for holding the catholyte. The recirculation of the bromine-containing medium is prevented using suitable mechanical means, thus allowing the accumulation of elemental bromine in the catholyte reservoir. In this way, bromine is produced and stored in a reservoir outside the electrode.

During discharge, the reverse chemical reaction takes place and an electric current is drawn from the cell. The bromine-containing liquid, which forms part of the catholyte, is brought to the cathodic side of the cell, while the anolyte is simultaneously circulated through the anodic side. This results in the dissolution of the zinc anode to give zinc ions and the reduction of elemental bromine to form bromide ions (and the generation of electrical current). The chemical reaction is represented by the following equation:

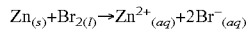

$$Zn_{(s)} + Br_{2(l)} \rightarrow Zn^{2+}_{(aq)} + 2Br^{-}_{(aq)}$$

FIG. 1 provides a schematic illustration of an example of a zinc-bromine cell, wherein numerals 1a and 1c indicate the anode and cathode, respectively, and numeral 2 represents the separator positioned between the electrodes. A reservoir for accommodating an aqueous solution of zinc bromide, used as the anolyte, is indicated by numeral 3a. Similarly, a reservoir 3c contains the catholyte, which consists of two liquid phases: an upper, aqueous solution of zinc bromide and a lower, dense organic phase comprising the molecular bromine in a form of a complex. The flow paths allowing the circulation of the anolyte and catholyte are respectively indicated by arrows (the streams are driven by pumps Pa, Pc). A suitable valve (v) allows injection of bromine into the flow path of the catholyte on discharge only.

As explained in U.S. Pat. No. 5,702,842, on cell discharge, zinc fragments may detach from the surface of the electrode. The presence of these zinc fragments in the electrolyte may interfere with the efficient operation of the cell. For this reason, it is proposed in U.S. Pat. No. 5,702,842 to introduce, at the end of the discharge process, bromine-containing electrolyte into the electrode space where zinc is deposited, namely, at the anodic side, in order to chemically dissolve the undesired zinc fragments in the solution.

Accordingly, the introduction of a small amount of bromine to the anolyte, e.g., between about 0.1% and 1%, and more specifically between 0.3% and 0.7% by w/w (relative to the weight of the anolyte) at the end of the discharge process is considered to be beneficial. For example, a moderate capacity unit operating at 100 kW·h contains about one ton of an electrolyte solution, and therefore, a few kilograms of bromine are to be added to the anodic half-cell prior to charging. Similarly, for industrial units operating at 0.5-2 MW·h capacity, the initial amount of bromine required prior to starting a new unit charge cycle is up to 100 kg. However, molecular bromine is an easily volatile liquid with a strong, disagreeable odor an irritating effect. Therefore, the transportation and storage of molecular bromine must satisfy stringent requirements, and employing liquid bromine in populated areas requires the application of stringent safety measures and trained personal.

SUMMARY OF THE INVENTION

The present invention provides a safe method for generating in-situ molecular bromine in a bromide-containing electrolyte solution suitable for use in a metal bromine cell, and more specifically in a zinc bromine cell, which method comprises chemically oxidizing bromide ($Br^{-}$) in said electrolyte solution in an acidic environment, to produce molecular bromine. The in-situ generation of molecular bromine according to the method of the present invention may facilitate the operation of various zinc-bromine rechargeable cells, including the zinc bromine cell having separate streams of anolyte and catholyte circulating in the cell, as shown in FIG. 1 (known as "flow battery").

Thus, in another aspect, the present invention provides a method for operating a zinc bromine cell, which method comprises in-situ generating molecular bromine in said cell in its discharged state as set forth above, and subsequently charging the cell. More specifically, the invention relates to a method for operating a zinc bromine rechargeable cell having an anloyte and catholyte circulating therein, which method comprises in-situ generating molecular bromine in the discharged state of said cell as set forth above, to produce molecular bromine at a concentration in the range between 0.1 and 1.0% by weight relative to the weight of the anolyte circulating in said cell, and charging the cell.

An electrolyte solution which is suitable for use according to the invention is an aqueous, concentrated solution of zinc bromide, as commonly employed for operating zinc bromine rechargeable batteries. The concentration of the zinc bromide in the aqueous electrolyte solution is not less than 1.0M, and preferably between 2.0 and 3.0M (prior to cell charge). In addition to zinc bromide, the electrolyte solution may optionally contain one or more other halide salts, such as zinc chloride, sodium chloride or potassium chloride, and also sulfate salts. The total concentration of these secondary water-soluble salts, which may be optionally present in the electrolyte solution, can be up to 1.5 M, e.g., between 0.5-1.5 M.

As already indicated before, the electrolyte solution further comprises at least one water soluble complexing agent which is capable of forming a water-immiscible liquid phase upon complexing with molecular bromine. Quaternary ammonium salts, especially halide salts and specifically bromide salts, are suitable for use as complexing agents. The cationic portion of said salts contains a nitrogen atom, which is bonded to four organic groups, (e.g., alkyl groups which may be the same or different). The tetracoordinate nitrogen may also be a member of a ring, namely, a heterocyclic ring, which heterocyclic ring may optionally contain a further heteroatom other than said tetracoordinate nitrogen. The cationic portion of said salts may also contain a positively charged nitrogen atom which is a member of a heteroaromatic ring. Tetra-alkyl ammonium bromides, and the bromide salts of N,N-dialkyl morpholinium, N,N-dialkyl pyrrolidinium and N,N-dialkyl pyridinium salts are suitable for use in the method provided by the present invention, wherein the alkyl groups are C1-C7 straight or branched alkyl groups, which may be the same or different from one another. Specific examples of quaternary ammonium bromide salts include N-methyl-N-ethyl morpholinium bromide (MEM), N-methyl-N-ethyl pyrrolidinium bromide (MEP), or their mixtures. Other complexing agents, or mixtures thereof, may also be used. The concentration of the one or more complexing agents in the electrolyte solution may be in the range between 0.4 and 1.0 M.

A suitable electrolyte solution which may be used in zinc bromine batteries has the following composition: from 2.0 to 3.0 M $ZnBr_2$, from 0.5 to 1.0 M chloride salts and from 0.5 to 1.0 M total concentration of N-methyl-N-ethyl pyrrolidinium bromide (MEP) and N-methyl-N-ethyl morpholinium bromide (MEM) as the complexing agent. In addition, one or more water soluble salts may be present in the electrolyte solution at a concentration ranging from 0.5 to 1.5 M.

BRIEF DESCRIPTION OF THE DRAWING

The accompanying drawing schematically illustrates a zinc-bromine-cell.

DESCRIPTION OF THE PREFERRED EMBODIMENTS

The method according to the invention involves the chemical oxidation of bromide in the electrolyte solution in an acidic environment. Accordingly, a bromide source, an oxidant and an acid are combined in the electrolyte described above in order to accomplish the reaction.

Although the bromide ion is of course already available in the electrolyte solution in the form of the zinc bromide salt, an auxiliary bromide source may be added to the solution in order to supply the bromide. A useful auxiliary bromide source may be, for example, hydrobromic acid, which may be applied in the form of an aqueous solution (e.g., of 48% w/w concentration). One or more water soluble bromide salts may also be used as the auxiliary bromide source. Suitable examples of such salts include—but are not limited to—sodium bromide (NaBr), potassium bromide (KBr) and ammonium bromide ($NH_4Br$). The salt is added to the electrolyte in an amount sufficient for generating the required concentration of molecular bromine. As noted above, this concentration is preferably from about 0.1 up to 1.0 percent by weight relative to the anolyte weight. The weight concentration of the auxiliary bromide source (either the alkali or ammonium salt) added to the electrolyte solution is in the range between 0.5 to 10% relative to the weight of the anolyte (the exact amount is dictated by the stoichiometry of the chemical reactions which are presented below). If zinc bromide is used as the bromide source for the oxidation reaction, then a slight excess of said salt should be used over the amount intended for the normal operation of the cell.

Useful oxidants include various peroxide compounds. For example, hydrogen peroxide can be used as an oxidation agent to produce bromine from bromide in acidic medium according to the following chemical equation:

$$H_2O_2 + 2HBr \rightarrow Br_2 + 2H_2O \quad (1)$$

The amount of hydrogen peroxide in the electrolyte can be in the range between 0.1 and 0.3% (w/w relative to the anolyte), e.g., about 0.2% w/w. Hydrogen peroxide is commonly provided in the form of a commercially available 52% solution.

The peroxide of metals are also useful oxidizers in the method of the present invention. Zinc peroxide ($ZnO_2$) has been found to be especially useful in the oxidation of bromide to form molecular bromine in the electrolytic solution of a zinc bromine cell. The oxidation reaction proceeds rather smoothly, exhibiting a moderate exothermic profile, which can be conveniently controlled. In addition, the use of zinc peroxide as the oxidation agent results in the in-situ formation of zinc bromide as a by-product in the electrolytic solution. Zinc peroxide may be also provided in a form of a mixture with zinc oxide (ZnO); the mixture $ZnO_2$/ZnO is commercially available (e.g., from Aldrich). The aforementioned oxidizers may be used in the electrolyte solution in the following weight concentration ranges: from 0.1 to 5% of $ZnO_2$, e.g., about 0.3%, or from 0.2 to 10.0% of $ZnO_2$/ZnO (about 1:1 mixture or any mixture compositions), e.g., about 0.6% of said mixture. The relevant chemical reactions are as follows:

$$ZnO_2 + 2HBr \rightarrow ZnBr_2 + H_2O_2$$

$$H_2O_2 + 2HBr \rightarrow Br_2 + 2H_2O$$

$$ZnO + 2HBr \rightarrow ZnBr_2 + H_2O \quad (2)$$

Another class of utilizable oxidants includes bromate salts. In its most general form, the chemical oxidation of bromide using bromate as an oxidizing agent in an acidic environment is represented by the following chemical equation (3):

$$BrO_3^-(aq) + 5Br^-(aq) + 6H^+(aq) \rightarrow 3Br_2(aq) + 3H_2O(l) \quad (3)$$

Bromate salts which can be used as oxidizing agents in the practice of the present invention may be selected from the group consisting of potassium bromate ($KBrO_3$), sodium bromate ($NaBrO_3$) and zinc bromate ($Zn(BrO_3)_2$). For the case in which one of the aforementioned bromate salts is used as the oxidizing agent in conjunction with hydrobromic acid as the bromide source, then the general equation (3) is reduced to the following specific forms:

$$KBrO_3 + 6HBr \rightarrow 3Br_2 + KBr + 3H_2O \quad (3a)$$

$$NaBrO_3 + 6HBr \rightarrow 3Br_2 + NaBr + 3H_2O \quad (3b)$$

$$Zn(BrO_3)_2 + 12HBr \rightarrow 6Br_2 + ZnBr_2 + 6H_2O \quad (3c)$$

The weight concentration of the bromate salt oxidizer in the electrolyte solution can be in the following ranges: from 0.1 to 5% $KBrO_3$, e.g., about 0.2%; from 0.1 to 10% $NaBrO_3$, e.g., about 0.3%; or from 0.1 to 10% $Zn(BrO_3)_2$, e.g., about 0.3%.

Other useful oxidants include hypohalites. Specific hypohalite salts which can be used as oxidizing agents in the practice of the present invention may be selected from the group consisting of hypochlorites, e.g., NaClO.

As already noted above, the chemical oxidation of the bromide ion to generate molecular bromine is carried out in an acidic environment. The pH of the electrolyte solution is preferably adjusted within the range between 1.5 and 3.5, more preferably between 2.3 and 3.3, using either a monoprotic or a polyprotic acid (e.g., HBr, HCl, $H_2SO_4$) or a mixture thereof. Of course, if an acid other than HBr is used, then an auxiliary bromide source, in the form of a bromide salt, is added to the electrolyte. For example, in the specific case where bromate is used as the oxidizer, and both the bromide and bromate reactants are provided in the form of their alkali salts, the general equation (3) reduces to the following form (4):

 (4)

wherein M represents a cation of an alkali metal, A is the anion of the acid, and the product of the coefficients n and p equals 6. The reaction by-product is the salt $M_pA$.

Having fed the oxidizer, the acid, and optionally an auxiliary bromide source into the electrolyte solution according to the combinations and quantities set forth above, the oxidation reaction proceeds at room temperature (in the range between 20 and 30° C.) under stirring, and the desired amount of molecular bromine is generally formed after 1 to 24 hours. The measurement of the bromine content of the electrolyte solution can be carried out using acceptable titration techniques. For example, the reaction mixture may be periodically sampled and subjected to iodometric titration. Spectroscopy techniques may also be employed for monitoring the progress of the reaction and for measuring the amount of bromine formed, since the absorption of the reaction mixture correlates nicely with the concentration of bromine. Thus, calibration solutions containing different concentrations of molecular bromine can be prepared, against which the absorption of a sample taken from the reaction mixture is compared. Absorption spectroscopy can be used for low bromine concentration solutions, up to 1.5% w/w. At bromine concentrations higher than 1.5% iodometric titration can be used.

It should be understood that the method for generating elemental bromine provided by the present invention may be carried out in bromide-containing electrolytes used in various metal-bromine cell, e.g., vanadium-bromine cell, and is not limited to zinc bromine cells.

Furthermore, the method of the present invention may be used for the in-situ generation of elemental bromine at the discharge state of various zinc-bromine batteries utilizing flowing electrolyte, including batteries arranged in the form of serially connected bipolar electrodes (a stack arrangement, in which a plurality of bipolar electrodes and separators interposed therebetween are positioned between two terminal electrodes is described, for example, in U.S. Pat. No. 4,615,108). Once the desired bromine level is reached at the anolyte by employing the method of the invention, the battery may be subsequently charged according to methods known in the art (e.g., U.S. Pat. Nos. 5,459,390 and 6,036,937).

EXAMPLES

Preparation 1

An electrolyte solution was prepared by charging into an Erlenmeyer flask the following ingredients:
1) Zinc bromide brine (672 g of 76% w/w aqueous $ZnBr_2$ solution, commercially available from ICL-IP).
2) Zinc chloride brine (74 g of 50% w/w aqueous ZnCl2 solution, commercially available from ICL-IP).
3) MEP (commercially available from ICL-IP as 65% w/w aqueous solution); the concentration of the MEP in the electrolyte solution was 0.5M.
4) MEM (commercially available from ICL-IP as 65% w/w aqueous solution); the concentration of the MEM in the electrolyte solution was 0.5M.
4) An aqueous solution of hydrogen bromide (about 7-8 g of 48% w/w solution, commercially available from ICL-IP.
5) Deionized water, up to 1000 g.

The procedure set forth above was repeated to produce electrolyte solutions which were used in the following examples. The pH values of the resultant electrolyte solutions were about 2.4 (±0.5).

Example 1

Bromide source and acid: HBr
Oxidizer: $H_2O_2$

To 1000 g of an electrolyte solution containing $ZnBr_2$, $ZnCl_2$, HBr and MEP/MEM mixture in an Erlenmeyer flask, were added consecutively under stirring at 22° C. hydrobromic acid (20 g of an aqueous 48% HBr solution) and hydrogen peroxide (3.28 g of 52% $H_2O_2$ solution). The electrolyte solution was stirred in the closed flask at said temperature for 24 hours. The electrolyte solution was sampled in order to measure the bromine concentration at 2, 4, 18 and 24 hours after the beginning of the reaction. The concentration of bromine, which was measured in the electrolyte solution 24 hour after the beginning of the reaction, was about 0.8% (w/w). The measurements were carried out using either UV-vis absorption spectroscopy (against a calibration graph) or iodometric titration.

Example 2

Bromide source and acid: HBr
Oxidizer: zinc peroxide (as $ZnO_2$/ZnO mixture)

To 1000 g of an electrolyte solution containing $ZnBr_2$, $ZnCl_2$, HBr and MEP/MEM in an Erlenmeyer flask, were added consecutively under stirring at 22° C. hydrobromic acid (7 g of an aqueous 48% HBr solution) and a 1:1 mixture of $ZnO_2$/ZnO (1.3 g). The electrolyte solution was stirred in the closed flask at said temperature for four hours. The electrolyte solution was sampled 1, 2, and 4 hours after the beginning of the reaction in order to measure the concentration of molecular bromine. The bromine content of the electrolyte solution after four hours was ~0.1% (measured using the techniques set forth in Example 1).

Example 3

Bromide source and acid: HBr
Oxidizer: potassium bromate

To 1000 g of an electrolyte solution containing $ZnBr_2$, $ZnCl_2$, HBr and MEP/MEM in an Erlenmeyer flask, were added consecutively under stirring at 22° C. hydrobromic acid (63 g of an aqueous 48% HBr solution) and potassium bromate (9.5 g). The electrolyte solution was stirred in the closed flask at said temperature for four hours. Samples of the electrolyte solution were taken to analysis in order to measure the bromine concentration 1, 2, and 4 hours after the beginning of the reaction. Four hours after the initiation of the reaction, the concentration of the bromine in the electrolyte solution was about 2.5% (w/w), as determined by the techniques set forth in Example 1.

The invention claimed is:

1. A method for generating molecular bromine in bromide-containing electrolyte solution suitable for use in a metal bromine cell, wherein the electrolyte solution comprises zinc bromide, comprising
   feeding an oxidizer and an acid into said electrolyte solution, and
   chemically oxidizing bromide ($Br^-$) in said electrolyte solution in an acidic environment, to produce molecular bromine.

2. A method according to claim 1, wherein the bromide ion in the electrolyte solution is provided by the zinc bromide and/or by one or more auxiliary/sources selected from the group consisting of hydrobromic acid and water, soluble bromide salts.

3. A method according to claim 1, wherein an oxidant selected from the group consisting of peroxide compounds, bromate salts and hypohalites is used to chemically oxidize the bromide to bromine.

4. A method according to claim 3, wherein the oxidant is selected from the group consisting of hydrogen peroxide, zinc peroxide and zinc peroxide/zinc oxide mixture.

5. A method according to claim 4, wherein the oxidant comprises zinc peroxide.

6. A method according to claim 1, wherein the acidic environment in the electrolyte solution is formed by the presence of hydrobromic acid.

7. A method for operating a metal bromine cell, comprising generating molecular bromine in bromide-containing electrolyte solution in the discharged state of said cell, wherein said generating is by means of the method according to claim 1, and charging the cell.

8. A method for operating a zinc-bromine rechargeable cell having an anloyte and catholyte circulating therein, which method comprises in-situ generating molecular bromine in the discharged state of said cell according the method of claim 1, to produce molecular bromine at a concentration in the range between 0.1 and 1.0% by weight relative to the weight of the anolyte circulating in said cell, and charging the cell.

9. A method according to claim 1, wherein an oxidant selected from the group consisting of peroxide compounds, bromate salts and hypohalites is used to chemically oxidize the bromide to bromine.

10. A method according to claim 9, wherein the acidic environment in the electrolyte solution is formed by the presence of hydrobromic acid.

11. A method according to claim 2, wherein the acidic environment in the electrolyte solution is formed by the presence of hydrobromic acid.

12. A method according to claim 3, wherein the acidic environment in the electrolyte solution is formed by the presence of hydrobromic acid.

13. A method according to claim 4, wherein the acidic environment in the electrolyte solution is formed by the presence of hydrobromic acid.

14. A method according to claim 5, wherein the acidic environment in the electrolyte solution is formed by the presence of hydrobromic acid.

15. A method according to claim 9, wherein the oxidant is selected from the group consisting of hydrogen peroxide zinc peroxide and zinc peroxide/zinc oxide mixture.

16. A method according to claim 15, wherein the oxidant comprises zinc peroxide.

17. A method according to claim 16, wherein the acidic environment in the electrolyte solution is formed by the presence of hydrobromic acid.

18. A method according to claim 15, wherein the acidic environment in the electrolyte solution is formed by the presence of hydrobromic acid.

19. A method according to claim 1, wherein the pH of the solution is less than 3.5.

20. A method according to claim 19, wherein the pH of the solution is between 1.5 and 3.5.

21. A method according to clam 20, wherein the pH of the solution is between 2.3 and 3.3.

22. A method according to claim 1, wherein the acid is selected from the group consisting of hydrobromic acid, hydrochloric acid, sulfuric acid and mixtures thereof.

* * * * *